United States Patent
Kappus et al.

(10) Patent No.: US 9,667,173 B1
(45) Date of Patent: May 30, 2017

(54) ELECTROSTATIC PARAMETRIC TRANSDUCER AND RELATED METHODS

(71) Applicant: Turtle Beach Corporation, San Diego, CA (US)

(72) Inventors: Brian Alan Kappus, San Diego, CA (US); Mark W. Norris, Poway, CA (US); Elwood Grant Norris, Poway, CA (US)

(73) Assignee: Turtle Beach Corporation, San Diego, CA (US)

( * ) Notice: Subject to any disclaimer, the term of this patent is extended or adjusted under 35 U.S.C. 154(b) by 0 days.

(21) Appl. No.: 15/138,990

(22) Filed: Apr. 26, 2016

(51) Int. Cl.
*H02N 1/00* (2006.01)
*H04R 19/00* (2006.01)

(52) U.S. Cl.
CPC ........... *H02N 1/006* (2013.01); *H04R 19/005* (2013.01); *H04R 2217/03* (2013.01)

(58) Field of Classification Search
None
See application file for complete search history.

(56) References Cited

U.S. PATENT DOCUMENTS

| | | | | |
|---|---|---|---|---|
| 6,044,160 | A * | 3/2000 | Norris | B06B 1/0292 381/116 |
| 2004/0100163 | A1* | 5/2004 | Baumgartner | B06B 1/0622 310/334 |
| 2006/0285704 | A1* | 12/2006 | Kitazawa | H04R 3/002 381/117 |
| 2011/0108838 | A1* | 5/2011 | Kageyama | B06B 1/0292 257/49 |
| 2012/0148071 | A1* | 6/2012 | Dehe | H04R 1/005 381/116 |
| 2013/0162102 | A1* | 6/2013 | Sammoura | B06B 1/0292 310/321 |
| 2013/0278111 | A1* | 10/2013 | Sammoura | H01L 41/0926 310/317 |
| 2014/0232236 | A1* | 8/2014 | Atkins | H04R 7/08 310/300 |
| 2014/0233784 | A1* | 8/2014 | Norris | H04R 1/00 381/386 |
| 2015/0173625 | A1* | 6/2015 | Chaggares | A61B 8/4483 600/407 |
| 2016/0277843 | A1* | 9/2016 | Babayoff | H04R 17/005 |

* cited by examiner

*Primary Examiner* — Curtiz Kuntz
*Assistant Examiner* — Qin Zhu
(74) *Attorney, Agent, or Firm* — Sheppard Mullin Richter & Hampton LLP

(57) ABSTRACT

An electrostatic ultrasonic transducer includes a first conductive layer; a second conductive layer spaced apart from the first conductive layer; and a third conductive layer disposed between the first and second conductive layers, the third conductive layer being spaced apart from the first conductive layer and in physical contact with a part of the second conductive layer.

40 Claims, 10 Drawing Sheets

ELECTROSTATIC PARAMETRIC TRANSDUCER AND RELATED METHODS

TECHNICAL FIELD

The present disclosure relates generally to parametric speakers. More particularly, some embodiments relate to an electrostatic ultrasonic emitter.

BACKGROUND OF THE INVENTION

Parametric sound is a fundamentally new class of audio, which relies on a non-linear mixing of an audio signal with an ultrasonic carrier. One of the key enablers for this technology is a high-amplitude, efficient ultrasonic source, which is referred to here as an emitter or transducer. Ultrasonic emitters can be created through a variety of different fundamental mechanisms, such as piezoelectric, electrostatic, and thermoacoustic, to name a few. Electrostatic emitters are generally capacitive devices consisting of two conductive faces with an air gap, where at least one of the conductive faces has a texture that is critical to the functionality of the emitter.

Non-linear transduction results from the introduction of sufficiently intense, audio-modulated ultrasonic signals into an air column. Self-demodulation, or down-conversion, occurs along the air column resulting in the production of an audible acoustic signal. This process occurs because of the known physical principle that when two sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

Parametric audio reproduction systems produce sound through the heterodyning of two acoustic signals in a non-linear process that occurs in a medium such as air. The acoustic signals are typically in the ultrasound frequency range. The non-linearity of the medium results in acoustic signals produced by the medium that are the sum and difference of the acoustic signals. Thus, two ultrasound signals that are separated in frequency can result in a difference tone that is within the 60 Hz to 20,000 Hz range of human hearing.

Conventional audio systems have been implemented using electrostatic, or 'push-pull' audio speakers. FIG. 1 is a diagram illustrating a simple example of an electrostatic speaker. Conventional electrostatic audio speaker typically includes three basic components—stators 122, a diaphragm 112, and spacers 124. The stators 122 are typically made of insulator coated metal grids. The diaphragm 112 is a lightweight electrically conductive film stretched parallel to and between the two stators. For operation, the diaphragm 112 is charged to a fixed positive potential by a high-voltage power supply to create the charge. Once charged it can be forced to move by the application of an electric field between the stators.

The electric field is provided by applying large (1000+) differential voltages to the front and rear stators. The stators are connected to the system's audio amplifier and are charged by the voltage of the amplified audio signal. The voltage applied to one stator is equal or substantially equal to but the opposite polarity of the voltage applied to on the other stator. In response to the audio input signal, the voltage alternates between the stators 122 causing the diaphragm 112 to move in relation to the audio signal. This movement of the diaphragm 112 forces acoustic waves into the air. These waves are transmitted through both stators 122 and into the room. When the film is moving forward in each cycle, a positive pressure wave is emitted in the forward direction, and a refraction wave is emitted in the reverse. This positive plus negative pressure field is commonly called a 'dipole' speaker and increases directionality at the cost of low frequency reproduction. Because of this, electrostatic hi-fi speakers are almost always accompanied by a woofer to fill in the lower end of the frequency response.

There are some fundamental design considerations when engineering a traditional electrostatic. First, to achieve maximum fidelity (linear response), the film should be placed equidistant between the stators. Second, both stators 122 are open to prevent any trapped air from forming a mechanical resonance in the audio band of frequencies. The configuration is typically designed to deemphasize resonance to provide a relatively flat response across the range of operating frequencies. Second, because the stators 122 need to accommodate a significant movement of the diaphragm 112, they are positioned fairly far apart (~1 cm or more for the ~mm excursion of the film). Accordingly, the speaker has very low voltage sensitivity and needs 1000+V to achieve significant output. Lastly, the dipole response is a necessary consequence of this design and is not always preferred in a listening environment (compared to the monopole response of a traditional loudspeaker.

SUMMARY

Embodiments of the technology described herein include an ultrasonic audio speaker system, comprising an ultrasonic emitter. In various embodiments, an ultrasonic audio transducer, includes a first conductive element having first and second major surfaces; a second conductive element having first and second major surfaces and textural features formed on the first surface of the second conductive element and arranged in spaced apart relation to the first conductive element with the first surface of the second conductive element facing the first conductive element; and a third conductive element having first and second major surfaces and positioned between the first and second conductive elements such that the third conductive element does not contact the first conductive element and the second major surface of the third conductive element physically contacts at least some of the textural features of the second conductive element and forms a resonant cavity. In further embodiments, the ultrasonic emitter can be used for other applications in addition to ultrasonic audio applications.

The ultrasonic audio transducer can be configured with a resonant frequency defined by a volume of the open area between the second and third conductive elements, the pitch of the textural features on the second element, the tension of the third conductive element, and the thickness and areal density (mass per unit area) of the third conductive element.

The third conductive element may include an insulating layer and a conducting layer and be oriented such that the insulating layer is disposed between the conducting layer and the second conductive element.

The textural features may include a plurality of ridges extending beyond the first surface of the second conductive element, or they may include a plurality of spacers disposed on the first surface of the second conductive element. The spacers may include a plurality of dots disposed on the second conductive element.

The ultrasonic audio transducer of claim 8, wherein the second conductive element comprises a conductive layer and an insulating layer, and the spacers comprise a plurality of dots disposed on the insulating layer of the second conductive element.

In some embodiments, the first conductive element is transparent to ultrasonic signals and the second conductive element is not transparent to ultrasonic signals such that, in operation, an audio modulated ultrasonic signal is emitted from the ultrasonic audio transducer in one direction.

In another embodiment, and ultrasonic audio system includes: a transformer comprising first and second inputs and first, second and third outputs, a first winding between the first and second inputs, a second winding between the first and second outputs and a third winding between the second and third outputs; and an ultrasonic audio transducer. The ultrasonic audio transducer can be configured to include: a first stator electrically connected to the first output of the transformer; a second stator arranged in spaced apart relation to the first stator and electrically connected to the third output of the transformer; a conductive element positioned between the first and second stators and electrically connected to the second output of the transformer; and a plurality of textural features disposed between and in touching relation to the conductive element and the second stator; and a bias source coupled between the second output of the transformer and the conductive element.

In various embodiments, the conductive element may be disposed such that it is at a first spacing from the first stator and a second spacing from the second stator, wherein the second spacing is less than the first spacing; and a ratio of the number of turns in the second winding to the number of turns in the third winding may be proportional to the first and second spacings. This ratio may be in the range of 8:1 to 10:1. In further embodiments, a resistive element may be coupled between the bias source and the conductive element.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the accompanying figures. The drawings are provided for purposes of illustration only and merely depict typical or example embodiments of the invention. These drawings are provided to facilitate the reader's understanding of the systems and methods described herein, and shall not be considered limiting of the breadth, scope, or applicability of the claimed invention.

Some of the figures included herein illustrate various embodiments of the invention from different viewing angles. Although the accompanying descriptive text may refer to elements depicted therein as being on the "top," "bottom," "front," "rear" or "side" of an apparatus, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DESCRIPTION

Embodiments of the systems and methods described herein provide an electrostatic ultrasonic transducer for various applications, including audio and other applications. The electrostatic ultrasonic transducer can include, in various embodiments, a front stator that is preferably transparent to ultrasonic signals, a rear stator that can be implemented, for example, as a textured backplate, and a conductive film held in place under tension between the front and rear stators. In some embodiments, the conductive film is provided in contact with the rear stator. More particularly, the electrostatic ultrasonic transducer can be configured such that the conductive film contacts peaks of the textured backplate while leaving an air gap between non-contacting areas of the conductive film and the textured backplate.

Figure 1:
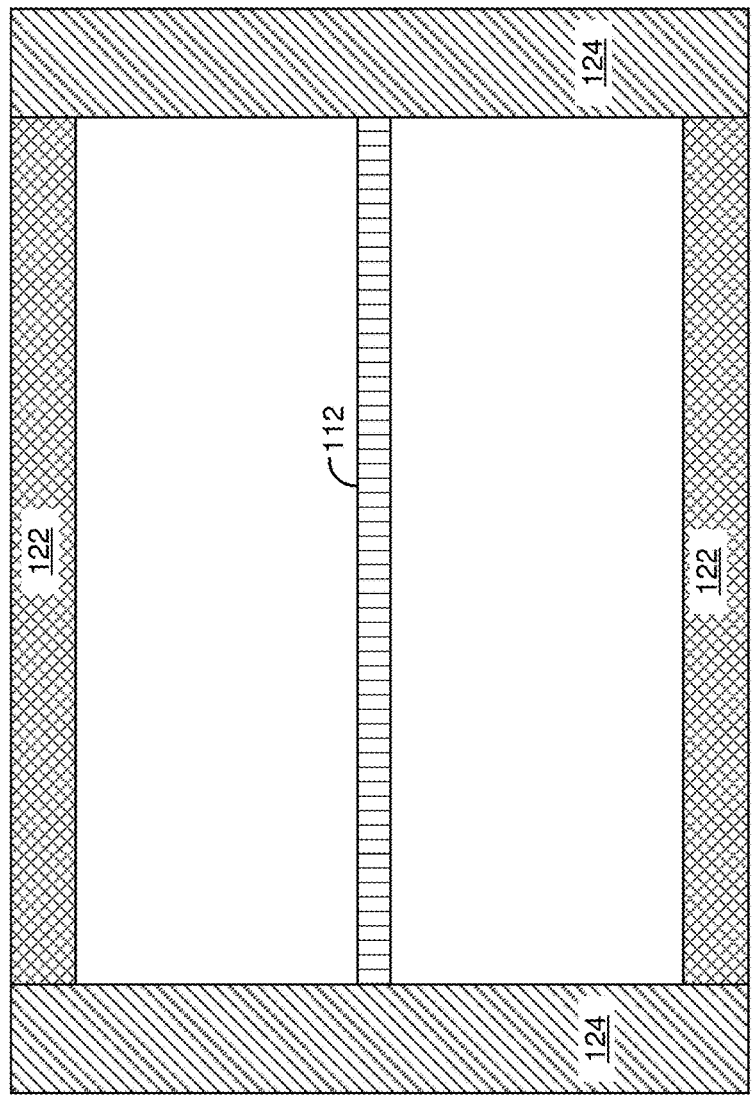
FIG. 1 is a diagram illustrating an example of a traditional electrostatic audio speaker.
Figure 2:
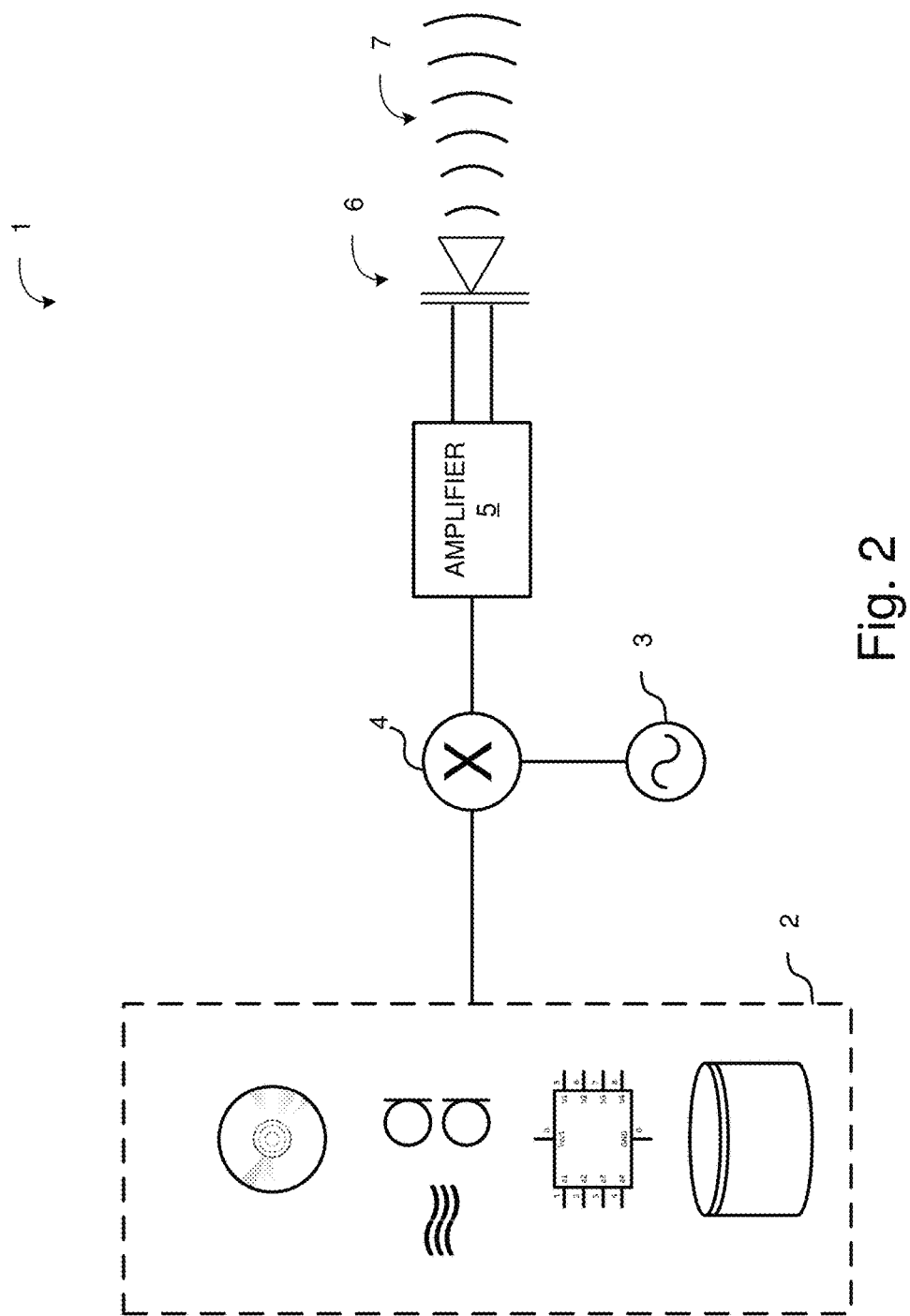
FIG. 2 is a diagram illustrating an ultrasonic sound system suitable for use with the emitter technology described herein.

The ultrasonic transducer can be used in a number of applications, including, for example, ultrasonic audio, intrusion detection, imaging, range finding, power transfer and other ultrasonic applications. Before describing the electrostatic ultrasonic transducer in greater detail, it is useful to describe an example application with which the transducer can be implemented. FIG. 2 is a diagram illustrating an example ultrasonic sound system suitable for use with the systems and methods described herein. In this exemplary ultrasonic audio system 1, audio content from an audio source 2, such as, for example, a microphone, memory, a data storage device, streaming media source, CD player, DVD player, content display device, or other audio source is received. The audio content may be decoded and converted from digital to analog form, depending on the source. The audio content received by the audio system 1 is modulated onto an ultrasonic carrier of frequency f1, using a modulator. The modulator typically includes a local oscillator 3 to generate the ultrasonic carrier signal, and multiplier 4 to multiply the audio signal by the carrier signal. The resultant signal is a double- or single-sideband signal with a carrier at frequency f1. In some embodiments, signal is a parametric ultrasonic wave or an HSS signal. In most cases, the modulation scheme used is amplitude modulation, or AM. AM can be achieved by multiplying the ultrasonic carrier by the information-carrying signal, which in this case is the audio signal. The spectrum of the modulated signal has two sidebands, an upper and a lower side band, which are generally symmetric with respect to the carrier frequency, and the carrier itself.

The modulated ultrasonic signal is provided to the ultrasonic emitter or transducer 6, which launches the ultrasonic wave into the air creating ultrasonic wave 7. As noted above, in various embodiments the transducer 6 can be implemented as an electrostatic ultrasonic transducer such as in accordance with the examples described herein.

When played back through the transducer at a sufficiently high sound pressure level, due to nonlinear behavior of the air through which it is 'played' or transmitted, the carrier in the signal mixes with the sideband(s) to demodulate the signal and reproduce the audio content. This is sometimes referred to as self-demodulation. Thus, even for single-sideband implementations, the carrier is included with the launched signal so that self-demodulation can take place. Although the system illustrated in FIG. 2 uses a single transducer to launch a single channel of audio content, one of ordinary skill in the art after reading this description will understand how multiple mixers, amplifiers and transducers can be used to transmit multiple channels of audio using ultrasonic carriers.

Figure 3:
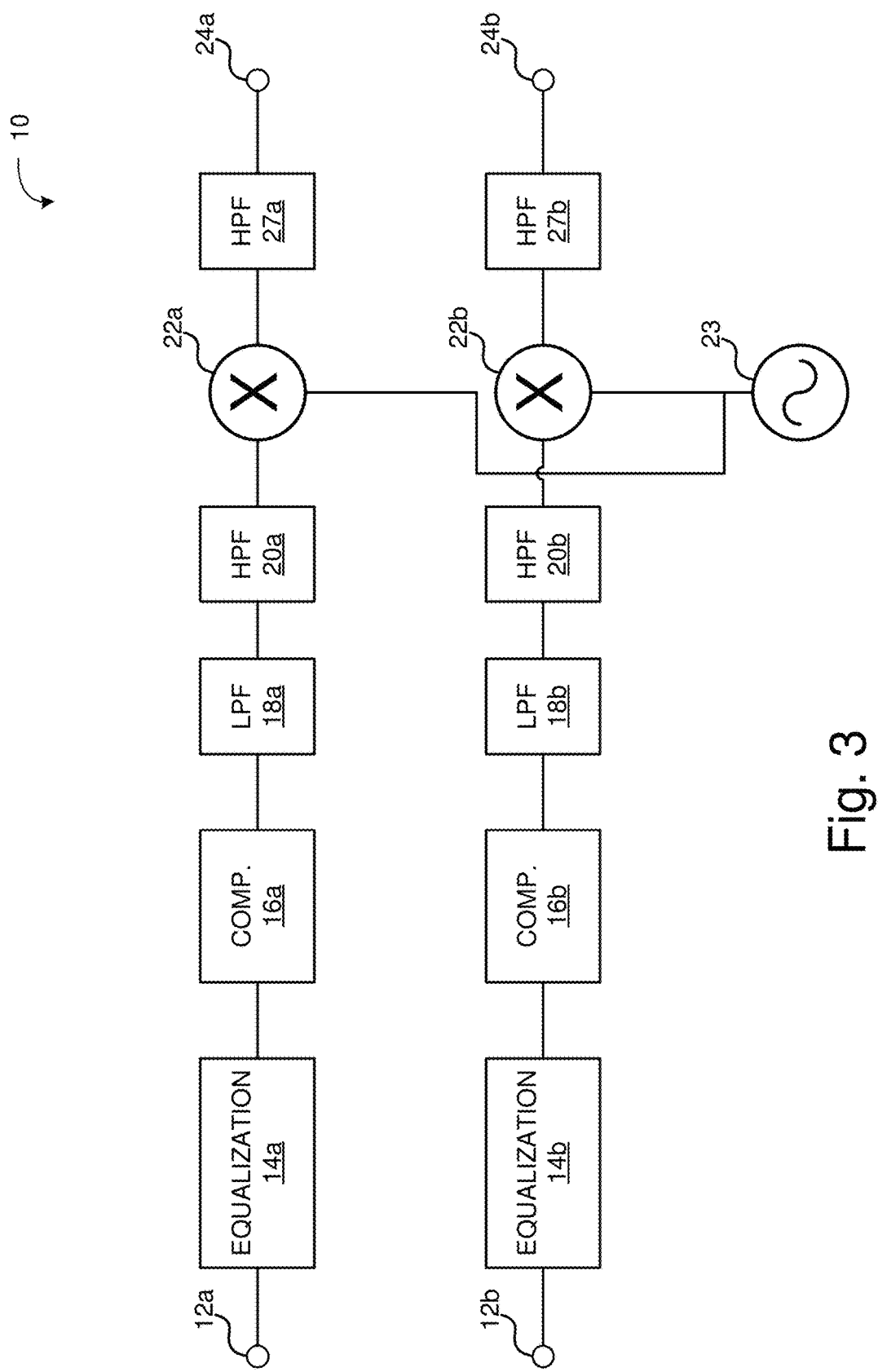
FIG. 3 is a diagram illustrating another example of a signal processing system that is suitable for use with the emitter technology described herein.

One example of a signal processing system 10 that is suitable for use with the technology described herein is illustrated schematically in FIG. 3. In this embodiment, various processing circuits or components are illustrated in the order (relative to the processing path of the signal) in which they are arranged according to one implementation. It is to be understood that the components of the processing circuit can vary, as can the order in which the input signal is processed by each circuit or component. Also, depending upon the embodiment, the signal processing system 10 can include more or fewer components or circuits than those shown.

The example shown in FIG. 2 is optimized for use in processing two input and output channels (e.g., a "stereo" signal), with various components or circuits including substantially matching components for each channel of the signal. It will be understood by one of ordinary skill in the art after reading this description that the audio system 1 can be implemented using a single channel (e.g., a "monaural" or "mono" signal), two channels (e.g., "stereo") (as illustrated in FIG. 3), or a greater number of channels.

Referring now to FIG. 3, the example signal processing system 10 can include audio inputs that can correspond to left 12*a* and right 12*b* channels of an audio input signal. Equalizing networks 14*a*, 14*b* can be included to provide equalization of the signal. The equalization networks can, for example, boost or suppress predetermined frequencies or frequency ranges to increase the benefit provided naturally by the emitter/inductor combination of the parametric emitter assembly.

After the audio signals are equalized, compressor circuits 16*a*, 16*b* can be included to compress the dynamic range of the incoming signal, effectively raising the amplitude of certain portions of the incoming signals and lowering the amplitude of certain other portions of the incoming signals. More particularly, compressor circuits 16*a*, 16*b* can be included to narrow the range of audio amplitudes. In one aspect, the compressors lessen the peak-to-peak amplitude of the input signals by a ratio of not less than about 2:1. Adjusting the input signals to a narrower range of amplitude can be done to minimize distortion, which is characteristic of the limited dynamic range of this class of modulation systems. In other embodiments, the equalizing networks 14*a*, 14*b* can be provided after compressor circuits 16*a*, 16*b*, to equalize the signals after compression.

Low pass filter circuits 18*a*, 18*b* can be included to provide a cutoff of high portions of the signal, and high pass filter circuits 20*a*, 20*b* providing a cutoff of low portions of the audio signals. In one exemplary embodiment, low pass filter circuits 18*a*, 18*b* are used to cut signals higher than about 15-20 kHz, and high pass filter circuits 20*a*, 20*b* are used to cut signals lower than about 20-200 Hz.

The high pass filter circuits 20*a*, 20*b* can be configured to eliminate low frequencies that, after modulation, would result in deviation of carrier frequency (e.g., those portions of the modulated signal that are closest to the carrier frequency). Also, some low frequencies are difficult for the system to reproduce efficiently and as a result, much energy can be wasted trying to reproduce these frequencies. Therefore, high pass filter circuits 20*a*, 20*b* can be configured to cut out these frequencies.

Low pass filter circuits 18*a*, 18*b* can be configured to eliminate higher frequencies that, after modulation, could result in the creation of an audible beat signal with the carrier. By way of example, if a low pass filter cuts frequencies above 15 kHz, and the carrier frequency is approximately 44 kHz, the difference signal will not be lower than around 29 kHz, which is still outside of the audible range for humans. However, if frequencies as high as 25 kHz were allowed to pass the filter circuit, the difference signal generated could be in the range of 19 kHz, which is within the range of human hearing.

In the example signal processing system 10, after passing through the low pass and high pass filters, the audio signals are modulated by modulators 22*a*, 22*b*. Modulators 22*a*, 22*b*, mix or combine the audio signals with a carrier signal generated by oscillator 23. For example, in some embodiments a single oscillator (which in one embodiment is driven at a selected frequency of 40 kHz to 100 kHz (or higher), which range corresponds to readily available crystals that can be used in the oscillator) is used to drive both modulators 22*a*, 22*b*. By utilizing a single oscillator for multiple modulators, an identical carrier frequency is provided to multiple channels being output at 24*a*, 24*b* from the modulators. Using the same carrier frequency for each channel lessens the risk that any audible beat frequencies may occur.

High-pass filters 27*a*, 27*b* can also be included after the modulation stage. High-pass filters 27*a*, 27*b* can be used to pass the modulated ultrasonic carrier signal and ensure that no audio frequencies enter the amplifier via outputs 24*a*, 24*b*. Accordingly, in some embodiments, high-pass filters 27*a*, 27*b* can be configured to filter out signals below about 25 kHz. Also, in various embodiments, error correction may be employed to reduce or cancel out distortion that may arise in transmission of the ultrasonic signal through the medium to the listener.

Having thus described an example environment with which an electrostatic ultrasonic transducer can be implemented, example transducer configurations are now described. After reading this description, one of ordinary skill in the art will understand how to implement this transducer in applications other than audio applications.

Figure 4:
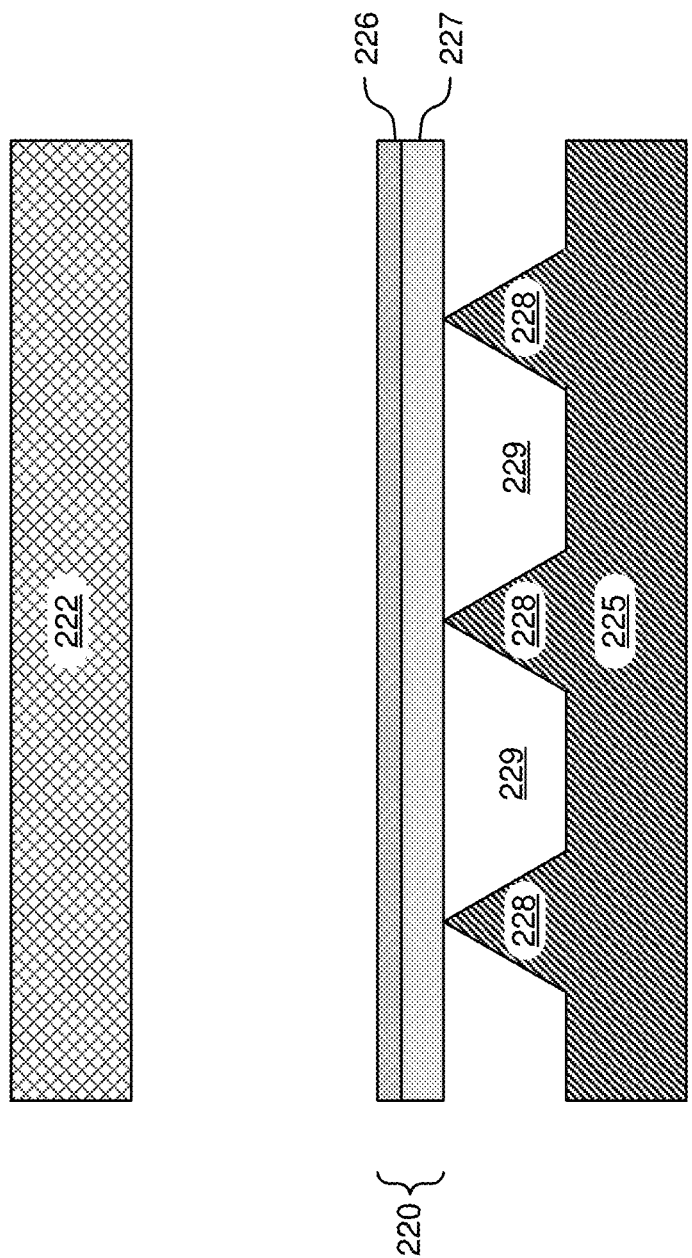
FIG. 4 is a diagram illustrating an example electrostatic ultrasonic transducer in accordance with one embodiment of the technology described herein.

FIG. 4 is a diagram illustrating an example electrostatic ultrasonic transducer in accordance with one embodiment of the technology described herein. With reference now to FIG. 4, this example includes a front stator 222, a rear stator 225 and a conductive element 220.

Front stator 222 and rear stator 225 are arranged in a spaced apart relationship with one another so that they are not directly contacting one another. Conductive element 220 is disposed between front stator 222 and rear stator 225 and is arranged so as to not directly contact front stator 222. In some embodiments, front stator 222, rear stator 225 and conductive element 220 are arranged parallel or substantially parallel to one another. These components can be mounted in a frame such that their relative positioning can be maintained. Additionally, the frame can be configured to provide tension to conductive element 220. In another embodiment, conductive element 220 can be mounted to the edges of rear stator 225 using mechanical fasteners such as clamps, clips or other like devices, or via adhesives such as glues, or via a combination thereof. These mounting elements can also be configured to provide tension to conductive element 220. Preferably, sufficient tension is provided such that conductive element 220 is drawn taut and flat across rear stator 225 to allow mechanical vibration in response to audio modulated ultrasonic signals applied to the stators. Additional tension can be applied to adjust the performance of the transducer, such as to adjust the resonant frequency of the transducer. As with the other transducer drawings in this document, electrostatic ultrasonic transducer of FIG. 4 is not drawn to scale, and only a segment of a cross section of the transducer is illustrated. In the example illustrated in FIG. 4, front stator 222 is shown as being positioned in a spaced-apart relation to conductive element 220 and rear stator 225. In other embodiments, front stator 222 and conductive element 220 can be affixed directly to the rear stator 225.

Front stator 222 and rear stator 225 are made of a conductive material such as, for example, copper, tin, aluminum, brass, metalized plastics, or other conductive elements or alloys such as CuAg, CuAgZn, CuMg, AlMg, AuAg, FeNi, among others. They can be a solid conductor or a laminate or other layered structure such as a metalized plastic or film. Although not illustrated in FIG. 4, front stator 222 and rear stator 225 are electrically connected to an ultrasonic audio amplifier of the ultrasonic audio system (See FIG. 10, for example). An example of an amplifier is amplifier 5 illustrated in FIG. 2, configured to output a bipolar signal. The amplifier can be configured such that the ultrasonic audio signal, which includes the audio signal modulated onto an ultrasonic carrier, provides an equal but opposite voltage to front stator 222 and rear stator 225, which corresponds to the audio modulated ultrasonic carrier. This time-varying charge on the stators causes a time varying attraction and repulsion of the conductive film 220, which in operation is itself charged. This time varying attraction and repulsion results in a vibration of the charged conductive element 220 in accordance with the audio modulated signal. This causes a pressure wave of the audio modulated ultrasonic signal to be launched into the surrounding medium (e.g., the air).

Conductive element 220 in this example is a film having two layers or regions: a conductive layer or surface 226 and an insulating layer 227. In various embodiments, conductive film can be implemented as a metallized film, wherein a metallized layer or other conductor (conductive layer 226) is deposited onto an insulative film substrate (insulating layer 227). The substrate can be, for example, polypropylene, polyimide, polyethylene terephthalate (PET), biaxially-oriented polyethylene terephthalate (e.g., Mylar, Melinex or Hostaphan), Kapton, parylene, or other substrate. Preferably, insulating layer 227 has a sufficiently low conductivity such that it acts as an insulator between conductive layer 226 and rear stator 225. In other embodiments, rear stator 225 can have an insulating coating deposited thereon, which could eliminate the need for an insulating layer 227, or allow a thinner or otherwise less resistive insulating layer 227 to be implemented. Ideally, insulating layer 227 and insulating materials on rear stator 225, if any, when combined are sufficiently resistive to prevent shorting between conductive layer 226 and rear stator 225. As a film or other structure that is greater in length and width than it is in depth, the stators and the conductive layer can include top and bottom (or front and rear) major surfaces.

Conductive layer 226 can comprise a separate layer of material that is laminated or otherwise sandwiched together with insulating layer 227. In other embodiments, conductive layer 226 can be a conductive material that is deposited onto insulating layer 227 such as, for example, by a chemical vapor deposition or other deposition techniques, by doping, and so on. Accordingly conductive layer 226 can comprise any of a number of conductive elements or alloys including those described above. Conductive layer 226 can also comprise other formations such as, for example, carbon nanotubes, woven nanotubes, and graphene. Other materials such as indium tin oxide (ITO), fluorine doped tin oxide (FTO), and doped zinc oxide, and so on, can also be used.

Front stator 222 can be made of a material that is transparent or substantially transparent to ultrasonic audio signals such that it does not provide an undue amount of attenuation to the ultrasonic audio signals (pressure wave) generated by the movement of conductive element 220. This allows the pressure wave to pass through front stator 222 so that the emitter produces sufficient audio output. In some embodiments, this may be configured such that less than 50% attenuation (6 dB) is experienced. While absolute transparency to ultrasonic signals may be difficult to achieve, structures that introduce only a very small amount of attenuation of the ultrasonic signal can provide the transparency desired for most applications. Accordingly, materials that only attenuate the ultrasonic signal by a few decibels (e.g., 0-2 dB, <3 dB, <5 dB<6 dB, or others as desired for the system) may be deemed sufficiently transparent for these purposes. Transparency, in other words, can be said to be achieved when the ultrasonic audio transducer provides sufficient audio output for its intended application.

For ultrasonic transparency front stator 222 can be made of a conductive sheet with holes or other apertures. Examples can include a wire mesh or a sheet of metal with patterned holes. Another example includes a sheet of plastic that has been metalized with holes (and in some embodiments coated with an insulator). Accordingly, materials such as grids, meshes, or other materials with openings (e.g., periodic openings that can be tuned to be transparent to the operating frequency of the emitter) can be used. In various embodiments, a finely woven metal mesh can be used. Such a mesh can be implemented with fine materials having, for example, a round wire diameter of less than three mils. In various embodiments, the hole or opening diameter or cross-section is of a dimension that is less than the physical spacing between front stator 222 and conductive element 220, and solid or closed portions are kept to a minimum. Similarly, in various embodiments the hole or opening diameter or cross-section is of a dimension that is small compared to the spacing between front stator 222 and rear stator 225. This dimension can be chosen, for example, to avoid compromising output by having spatial variations in the electric field.

Because front stator 222 is conductive, these materials can be coated with an insulating material such that the conductive portion isn't exposed to a listener or other user of the system. Preferably, insulating material is also transparent or substantially transparent to ultrasonic signals and can comprise, for example, polyurethane, rubber, polyethylene terephthalate (PET), polytetrafluoroethylene (PTFE), an oxidized coating (such as anodization), and so on. Front stator 222 is also preferably fabricated to be sufficiently rigid to avoid flexing of the element that could cause it to come into contact with conductive element 220.

Rear stator 225 may also be transparent to the ultrasonic pressure wave. However, rear stator 225 need not be transparent to the ultrasonic pressure wave and in configurations where it is not transparent, the electrostatic ultrasonic emitter emits signals in one direction, unlike conventional electrostatic audio speakers, which are bipolar speakers. Accordingly, rear stator 225 can be made from any of a number of conductive materials including, for example, copper, tin, aluminum, brass, or other conductive elements or alloys such as CuAg, CuAgZn, CuMg, AlMg, AuAg, FeNi, among others. Rear stator 225 can be a solid conductor or can be of a layered or coated construction. For example, a conductive or nonconductive core can be coated with the conductive material to provide the conductivity. Metal coated plastics or other like structures, for example, can include cores such as epoxies or resins, polycarbonates, Lexan, and fiberglass (or other fiber) reinforced versions of the foregoing. Such structures can be lighter and can be provided at a lower cost as compared to their solid metal counterparts.

Rear stator 225 is textured to provide both points (whether actual points or surface areas) of physical contact with conductive element 220 as well as gaps or openings between conductive element 220 and rear stator 225. The size of the gaps, spacing of the gaps, and the areal density and tension of conductive element 220 can be selected to tune the resonance of electrostatic ultrasonic transducer. In other embodiments, this approximately 10 μm in size, although other dimensions can be selected. In other embodiments, the textural elements are spaced in a grid with 0.7 mm pitch, although other dimensions can be selected. In other embodiments, the conductive element 220 is tensioned to 40 pounds per square inch, although other tensions can be used. The texture illustrated in this example is in the form of ridges spaced periodically across the surface of rear stator 225. In other embodiments, the texture can be other shapes (whether periodic or aperiodic) or sizes. For example, as discussed below, embodiments can be implemented to include spacers such as glass or polymer dots, beads or other shapes or patterns. Dots, beads or other shapes or patterns including, for example, ridges, bars, pyramids, blocks, or otherwise) can be placed or they can be printed, such as by screen printing.

In the example illustrated in FIG. 4, rear stator 225 includes textural features. The textural features in this example are in the form of ridges 228 protruding from a major surface of the stator, having a triangular cross section with peaks that contact the bottom of conductive element 220. The ridges are spaced to form valleys 229 between the ridges providing air volume in cavities between conductive element 220 and rear stator 225. This air volume allows conductive element 220 to vibrate in response to the charge induced in the stators by the audio modulated ultrasonic signal, and this volume can be adjusted to tune the resonance of the electrostatic ultrasonic emitter. The resonant frequency of the transducer is defined by a volume of the open area between the conductive element 220 and stator 225, the spacing of the textural elements 228, and the tension, thickness and density of the conductive element 220.

The textural elements need not be ridges having a triangular cross-section as illustrated in this example, but can instead be formed of other shapes or sizes. For example, the ridges may be configured with other cross sections such as square, rectangular, rounded or curved, hemispherical, and so on. The ridges can span part or substantially all of the length or width of stator 225 (depending on their orientation, or they can be mixed orientations, or disposed at one or more angles across stator 225). Likewise, the textural elements can be spaced closer together or farther apart. In the example of FIG. 4, only a segment of the transducer is illustrated, showing just three ridges 228. In practice, rear stator 225 can include numerous textural elements.

Although any of a number of different textured backplate configurations can be used for rear stator 225, examples of a textured backplate and techniques for forming the same are described in U.S. Pat. No. 9,002,043, to Norris et al, filed on Nov. 13, 2013, entitled Parametric Transducer and Related Methods, which is incorporated by reference herein in its entirety. Examples of textured backplates in that document are shown in and described with reference to, for example, FIGS. 9A through 16B.

The example electrostatic ultrasonic transducers described herein may be implemented to differ from conventional bipolar loudspeakers in several key areas. First, as the example of FIG. 4 illustrates, conductive element 220 is placed in physical contact with rear stator 225, with an insulating layer 227 positioned between them. Also, as noted above, the electrostatic ultrasonic transducer includes textural members disposed on or formed as an integral part of the rear stator 225. These textural members provide a small air gap between conductive element 220 and rear stator 225. This air gap can be adjusted along with thickness and density of conductive element 220 to tune the resonance of the electrostatic ultrasonic transducer. The ability to tune the transducer can significantly increase the transducer sensitivity in a narrow frequency range. This is well suited to an ultrasonic audio signal, which comprises an ultrasonic carrier onto which the audio signal is modulated with relatively narrow bandwidth.

Additionally, in various embodiments, front stator 222 can be positioned very close to conductive element 220. This configuration is possible because the movement required to launch an ultrasonic wave into the medium is very small as compared to the movement required to launch an acoustic audio wave from conventional loudspeakers (e.g., in the 20 Hz to 20 kHz range). Because conductive element 220 is producing ultrasonic frequencies, this excursion is very low, on the order of 1 to 2 μm. Accordingly, the spacing between the front stator 222 and the conductive element 220 can be set to accommodate the small distance plus a safety margin to prevent or reduce the risk of unintentional shorting or arcing. Such configurations can be implemented to enhance the voltage sensitivity of the transducer while still providing proper levels of ultrasound to produce sufficient audio output at the listener. As front stator 222 is positioned closer to conductive element 220, the electric field between the two elements improves and the result is a higher sensitivity transducer that consumes less power. Accordingly, in some implementations it can be a design goal to place front stator 222 as close as possible or practical to conductive element 220. Although not shown in the example of FIG. 4, spacer dots (e.g., polymer dots), glass beads or other like structures can be implemented in various embodiments between conductive element 220 and front stator 222 to enable closer spacing of front and rear stators, while preventing (or reducing the likelihood of) shorting. Examples of these are discussed in further detail below with reference to FIGS. 7-9.

Further, in designs including a rear stator that is not transparent ultrasound, the electrostatic ultrasonic transducer does not produce a bipolar pattern. Instead, the resonant cavity formed by the air gap captures any rarefaction wave, and ultrasonic audio signals are substantially only emitted from the front of the unit.

Figure 5:
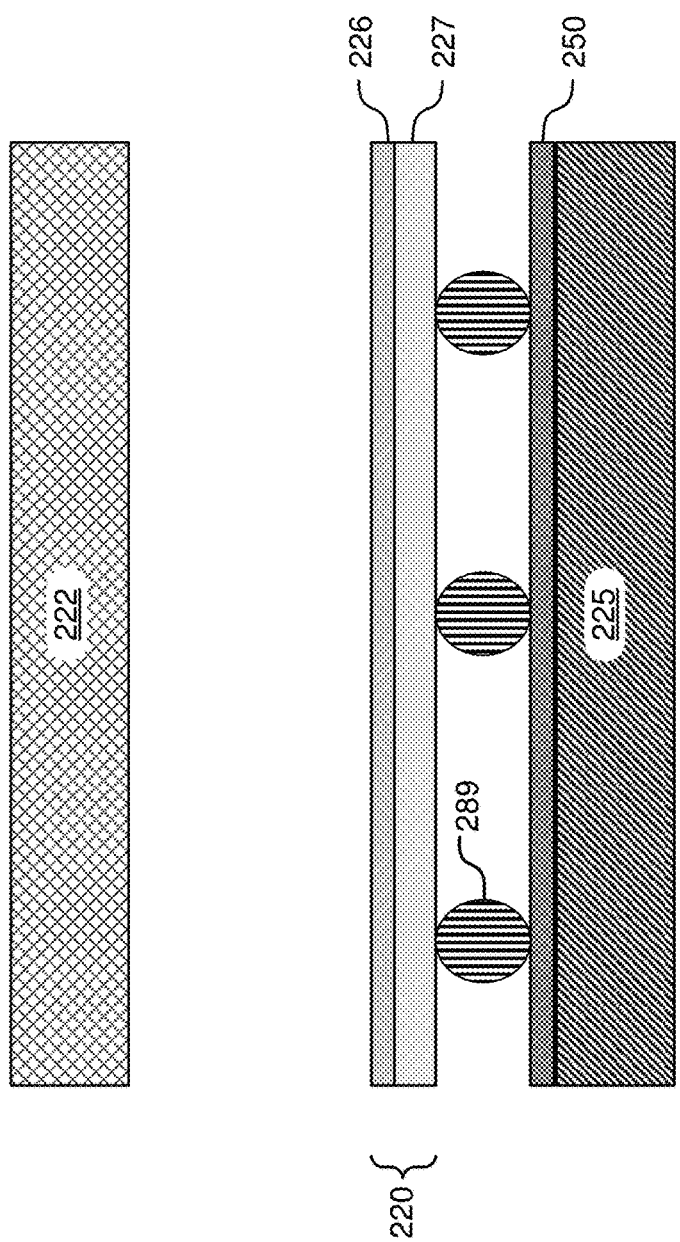
FIG. 5 is a diagram illustrating another example configuration of an electrostatic ultrasonic transducer in accordance with one embodiment of the technology described herein.

Having thus described one embodiment of an ultrasonic transducer, additional example embodiments are now described. In these and other embodiments, the various conductive and insulating layers, stators, and conductive elements can be made using the materials as described above for these components. FIG. 5 is a diagram illustrating another example configuration of an electrostatic ultrasonic transducer in accordance with one embodiment of the technology described herein. This example includes a plurality of spacers 289 implemented as the textural features (as opposed to ridges as was shown in the example of FIG. 4). The spacers 289 can be patterned onto rear stator 225 or conductive layer 220 using any of a number of deposition techniques. For example, spacers 289 can be made of glass, plastics, enamels, insulating inks and fluids and other types of insulating materials. Insulating materials can be printed, screen printed, placed, pipetted manually set, or otherwise deposited at desired locations to form spacers 289 on either or both rear stator 225 and conductive layer 220. As with the textural ridges of the example of FIG. 4, spacers 289 can be used to provide an air gap between conductive element 220 and rear stator 225 to tune the resonance of the transducer to a desired resonant frequency. Accordingly, spacers 289 can be a plurality of dots or beads to provide textural features between rear stator 225 and conductive element 220. The dots can be of different shapes, and are illustrated in FIG. 5 as generally spherical in shape. The dots need not be spherical, but can be elongated, squared, polygonal, pyramidal, hemispherical and so on, or a combination of the foregoing. For example embodiments where spacers 289 are printed onto rear stator 225 (e.g., on insulating layer 250 as shown in FIG. 5)) they may be shaped such that the base contacting rear stator 225 is broader than the peak. Such a configuration can in various embodiments reduce or minimize the amount of contact with, and thus dampening of, conductive layer 220.

In some embodiments, spacers 289 can be made of a nonconductive material, thereby providing insulation between conductive element 220 and rear stator 225. Accordingly, conductive element 220 can be positioned with the conductive surface 226 facing either toward or away from rear stator 225 (i.e., as shown in FIG. 5, or flipped). This example also illustrates an embodiment that includes in additional insulating layer 250 disposed on rear stator 225. This additional insulating layer 250 can be included, if needed, to prevent shorting between conductive element 220 and rear stator 225. Whether to include this additional insulating layer 250 and the amount of resistance introduced thereby will depend on a number of factors including, for example, the thickness of conductive element 220, whether conductive element 220 includes an insulating layer 227, the insulating properties of insulating layer 227, the amount of insulation provided by spacers 289 and the resulting air gap, the operating voltage is of the system, and so on.

Figure 6:
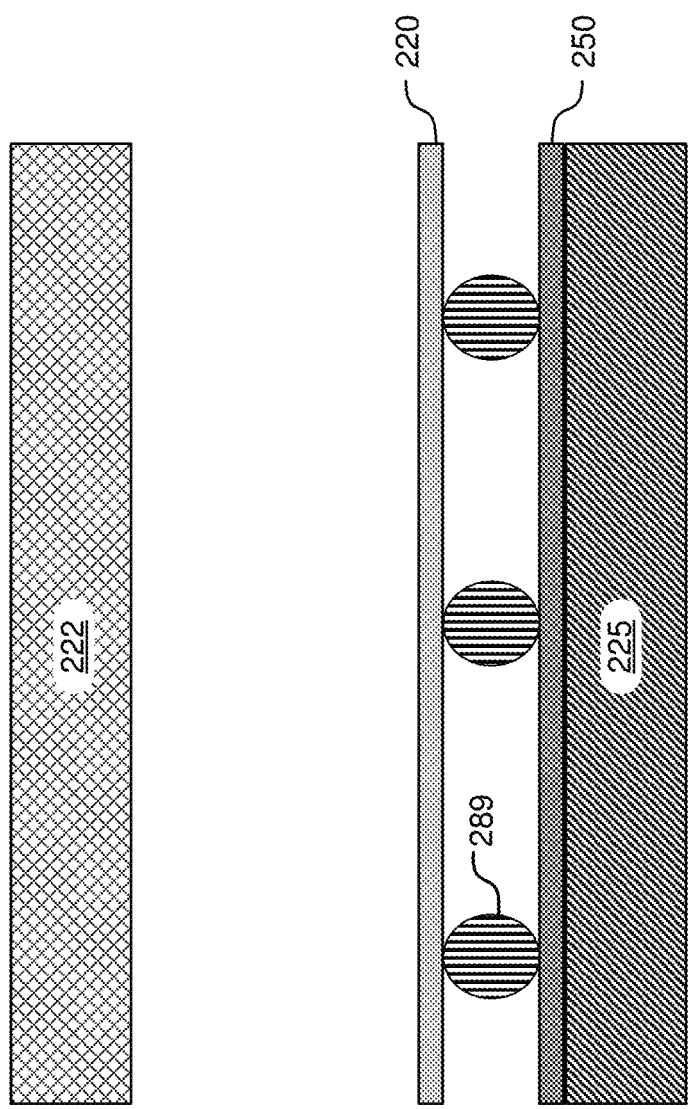
FIG. 6 is a diagram illustrating yet another example of an electrostatic ultrasonic transducer in accordance with one embodiment of the technology described herein.

FIG. 6 is a diagram illustrating yet another example of an electrostatic ultrasonic transducer in accordance with one embodiment of the technology described herein. In this example, conductive element 220 is a single layer and does not include insulating layer or region. In such embodiments, conductive element 220 can be implemented, for example, using a metal foil or a conductive membrane such as, for example, an Al, Cu, AG, Au or other metallic film. The film can also be made of conductive allows or more exotic materials such as, for example, graphene, single atom Si sheets, woven nanotubes, super thin metallic sheets, and so on. As this example illustrates, an additional insulating layer 250 may be included to provide sufficient insulation between conductive element 220 and rear stator 225.

Figure 7:
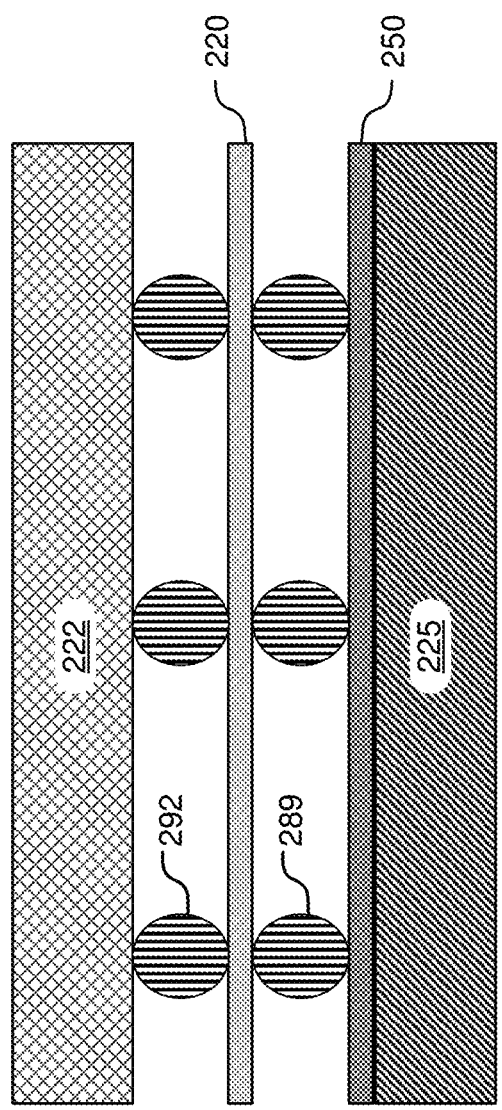
FIG. 7 is a diagram illustrating an example transducer having spacers disposed between the conductive layer and the front stator in accordance with one embodiment of the technology described herein.

As noted above, in many applications it is desirable to position front stator 222 as close as possible or practical to conductive element 220 to improve the efficiency of the transducer. However, as also noted above, it is important to avoid shorting or arcing between front stator 222 and conductive element 220. Therefore, in various embodiments, an additional layer of spacers can be included between conductive element 220 and front stator 222 to maintain physical separation between the two elements and to avoid flexure of front stator 222, which may lead to shorting or arcing for small spaces. FIG. 7 is a diagram illustrating still another example transducer; this example including spacers patterned on either or both of conductive element 220 and front stator 222. In this example, an additional layer of spacers 292 is patterned between (e.g., disposed on either or both of) front stator 222 and conductive element 220. As this example illustrates in comparison to the examples of FIGS. 5 & 6, front stator 222 is now positioned closer to conductive element 220 (although, as noted above, these illustrations are not necessarily made to scale).

As this example also illustrates, the textural features between rear stator 225 and conductive element 220 are provided by spacers 289. In other embodiments, other textural elements, including for example ridges 228 as shown in FIG. 4 can be used in combination with spacers 292. In addition to or in place of textural elements were spacers, embodiments can be implemented using posts or other like structures positioned between front stator 222 and rear stator 225 to maintain spacing between the elements. In embodiments using spacers 292, such spacers can be deposited on front stator 222 or conductive element 220 using the same techniques to place spacers 289. This can include, for example, printing, screen printing, pipetting, or otherwise forming these features at the desired locations. Preferably, spacers 292 are at the same location or substantially the same location relative to conductive element 220 as their counterpart spacers 289. In this manner, any attenuation that might be caused by the contact of spacers 289 with conductive element 220 is not unduly increased by adding additional different contact points by the introduction of spacers 292. The example in FIG. 7 illustrates conductive element 220 as comprising conductive layer 226 without insulating layer 227. In other embodiments, conductive element 220 can include both a conductive layer 226 and an insulating layer 227. As this example also illustrates, an additional insulating layer 250 may be included to provide sufficient insulation between conductive element 220 and rear stator 225.

Figure 8:
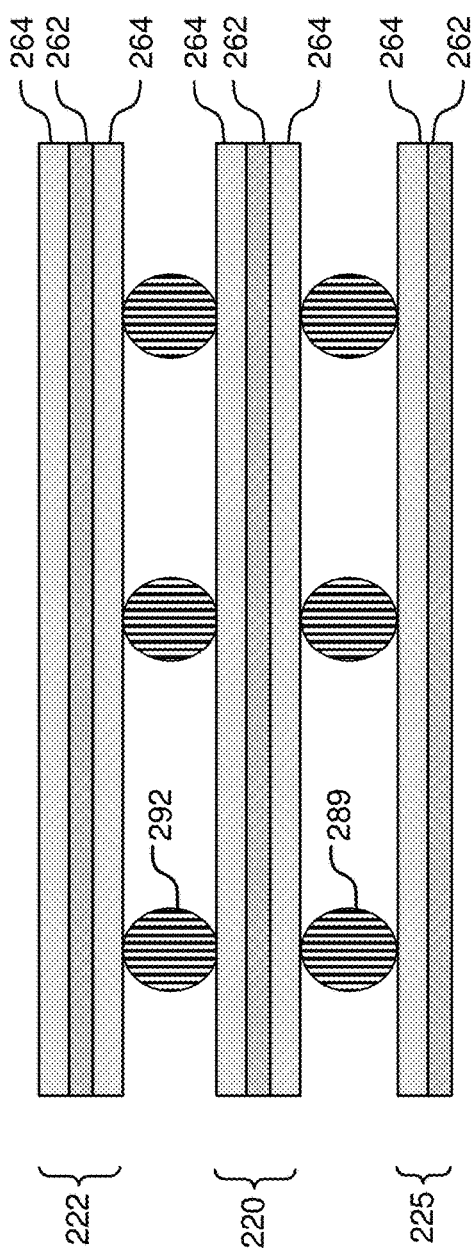
FIG. 8 is a diagram illustrating an additional example transducer configuration.
Figure 9:
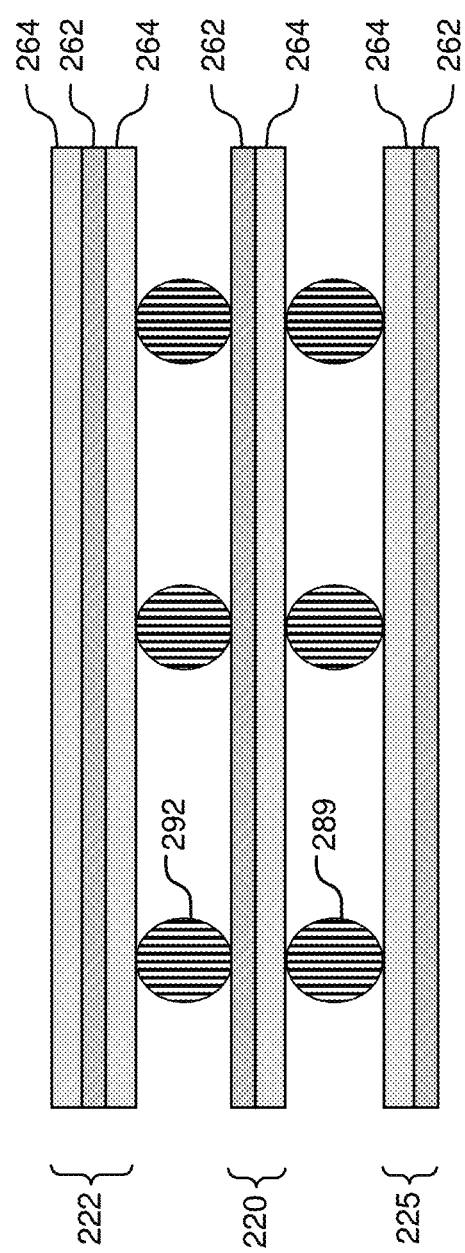
FIG. 9 is a diagram illustrating an additional example transducer configuration.

In various embodiments, other configurations for the layers can be implemented. FIGS. 8 and 9 are diagrams illustrating still further example transducer configurations. Like the example of FIG. 7, these examples include spacers 292 separating the conductive element 220 and the front stator 222, and spacers 289 separating the conductive element 220 and the rear stator 225. In the example of FIG. 8, front stator 222 includes a conductive layer 262 with an insulating layer 264 disposed on the top and bottom surfaces thereof. Likewise, conductive element 220 also includes a conductive layer 262 also with corresponding insulating layers 264 disposed on the top and bottom surfaces thereof. Rear stator 225 includes a conductive layer 262 with an insulating layer 264 disposed on its top surface. In the example of FIG. 9, front stator 222 includes a conductive layer 262 with an insulating layer 264 disposed on the top and bottom surfaces thereof; conductive element 220 includes a conductive layer 262 with an insulating layer 264 disposed on its bottom surface; and rear stator 225 includes a conductive layer 262 with an insulating layer 264 disposed on its top surface. As noted in the example of FIG. 7, in some configurations, the addition of spacers 292 can allow front stator 222 to be positioned closer to conductive element 220 than may be possible in configurations without these spacers. This is because spacers 292 can help to reduce the risk that front stator 222 makes unwanted contact with conductive element 220 even though the spacing between these two elements is reduced.

In one example implementation of the embodiment shown in FIG. 9, front stator 222 can be manufactured as a steel or other metal mesh having a Teflon coating. Spacers 292 can be arranged in a pattern such as a square pattern at approximately a 1 mm pitch. As noted above, spacers 292 can be printed onto conductive element 220 or front stator 222. Spacers 292 can be approximately 25 μm in diameter. Conductive element 220 can be made using a conductive film of approximately 1 mil in thickness. In the illustrated example, the conductive surface of the film (e.g., conductive layer 262) is facing up, while the insulating layer 264 (e.g. the substrate of the film) is facing down. Conductive layer 262 of rear stator 225 can be fabricated using a flat aluminum or other metal sheet and can be provided with a Parylene coating to provide the insulating layer 264, which can be approximately 10 μm in thickness. Spacers 289 can have a similar pitch as spacers 292 and can be aligned with spacers to 92. Spacers 289 can be approximately 10 μm in diameter.

Figure 10:
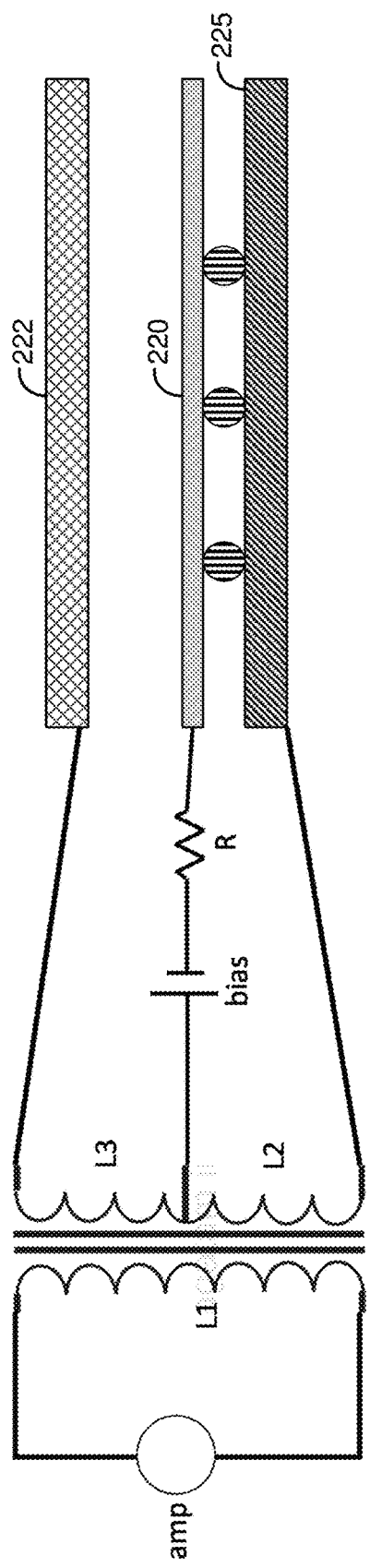
FIG. 10 is a diagram illustrating an example of a representative electrical connection to an ultrasonic audio amplifier in accordance with one embodiment of the technology described herein.

FIG. 10 is a diagram illustrating an example of a representative electrical connection to an ultrasonic audio amplifier in accordance with one embodiment of the technology described herein. This example uses a multi-tap inductor L1, L2, L3 to drive the electrostatic ultrasonic transducer. In this case inductor, L3 is electrically connected across front stator 222 and conductive element 220, and L2 is electrically connected across conductive element 220 and rear stator 225. Accordingly, electrical contacts can be provided on front stator 222, conductive element 220 and rear stator 225 to facilitate the electrical connection. As shown, in this example the electrical connection between the multi-tap inductor and conductive element 220 is made via a bias source and a resistance R.

In a traditional electrostatic loudspeaker, the inductance of L2 generally equals L3, meaning that the number of turns separating the rear stator from the film is the same as the number of turns separating the front stator from the film. This allows the conventional ultrasonic loudspeaker to be driven in a bipolar fashion. Embodiments of the transducers described herein can be implemented with L2≠L3. For example, in various embodiments of the electrostatic ultrasonic transducer, the inductance of L2 (and hence the number of turns in L2) is much less than the inductance (and number of turns) of L3. This can be accomplished due to the relatively close spacing of the conductive element 220 to rear stator 225. The optimal ratio of L2 to L3 will depend on the actual geometry of the emitter. Preferably, the ratio of L3:L2 is proportional to the ratio of the spacing between conductive element 220 and front stator 222 and rear stator 225. In some embodiments, this ratio is between 2:1 and 5:1. In other embodiments, this ratio can be between 5:1 and 8:1. In still further embodiments, this ratio can be between 7:1 and 9:1 or between 8:1 and 10:1. In other embodiments, this ratio can be greater than 9:1.

The ratio of L1 to L2+L3 may also be different from that of a conventional electrostatic loudspeaker. Conventional electrostatic loudspeakers typically have a current ratio of 10 to 1 (secondary to primary), which is needed to achieve the required voltage levels. In contrast, the electrostatic ultrasonic emitter is much more voltage efficient due to its geometry, and therefore a lower turns ratio can be tolerated. For example, in some embodiments, a turns ratio (L1:L2+L3) of 4:1 can be implemented. In other embodiments, a lower turns ratio such as, for example, 3:1 or 2:1 can be implemented. Accordingly, a lower-distortion emitter can be achieved. An additional advantage of this geometry is that a lower bias voltage can be used as well. For example, bias voltages of around 300V or less can be used to bias the emitter, as compared to voltages of approximately 1500 or greater with conventional electrostatic loudspeakers.

In various embodiments, the resistance provided by resistor R is sufficiently large to allow conductive element 220 maintain its charge, but not so large that it takes an unduly long amount of time to charge conductive element 220.

Another advantage they can be obtained by configurations in accordance with various embodiments of the technology disclosed herein is at the capacitance presented to the amplifier is the capacitance between front stator 222 and rear stator 225, as compared to conventional ultrasonic transducers in which the capacitance would be that between conductive element 220 and rear stator 225. This lower capacitance could allow the transducer to be designed with a higher resonant frequency. This can also lead to a more inductive circuit, which can enable embodiments to be implemented without the transformer being implemented as a resonant transformer.

In other embodiments, rather than charging conductive element 220 for operation, conductive element 220 can be made using a permanently charged film. For example, the film can be made of a dielectric material that has a quasi-permanent electrical charge such as, for example, an electret. Quartz and other forms of silicon dioxide can be used to form electret materials. Synthetic materials can also be used to form the electret material such as, for example, fluoropolymers, polypropylene, and Polyethylene terephthalate (PET).

In further embodiments, transparent ultrasonic audio transducers can be implemented using transparent materials for one or more or all of the front and rear stators, the conductive elements and the textural ridges. For example, transparent conductive films such as ITO (e.g., InSnO), transparent conductive polymers, graphene, Carbon nanotubes (CNTs) and silver nanotubes (and thin films thereof), transparent conductive oxides (TCO), atomic layer-controlled Al-doped ZnO (ZnO:Al) films grown by atomic layer deposition (ALD) on glass substrate and the like can be used as conductive regions in the transducer. Also, fine metal meshes and other like materials that don't materially impair transparency. These transparent conductive materials can, for example, be layered, printed or otherwise deposited on transparent support structures (e.g., films or layers) to create the stators and conductive element of the transducer. Likewise, in embodiments where the textural ridges are spacers, the spacers can be made with transparent dielectric materials such as glass, plastics, polymers and the like. Additional examples of transparent materials for conductive and insulating layers and spacers can be found in U.S. Pat. No. 8,976,997 to Hecht, et al., titled Transparent Parametric Emitter and issued on Mar. 10, 2015, which is incorporated by reference herein in its entirety.

Accordingly, in various embodiments, the transparent transducer is manufactured with materials providing sufficient light transmittance in the visible spectrum to allow satisfactory transparency for a given application. For example, in some embodiments the light transmittance of the ultrasonic audio transducer in the visible spectrum is 50% or greater. In further embodiments, the light transmittance of the ultrasonic audio transducer in the visible spectrum is 60% or greater. In still further embodiments, the light transmittance of the ultrasonic audio transducer in the visible spectrum is 70% or greater. In still further embodiments, the light transmittance of the ultrasonic audio transducer in the visible spectrum is 80% or greater. As a further example, the light transmittance of the ultrasonic audio transducer in the visible spectrum is in the range of 70-90%. As yet another example, the light transmittance of the ultrasonic audio transducer in the visible spectrum is in the range of 75-85%. As still another example, the light transmittance of the ultrasonic audio transducer in the visible spectrum is in the range of 80-95%.

Another advantage that can be obtained through various implementations of the technology described herein is that of a lower harmonic distortion as compared to single-stator ultrasonic transducers. With a single-stator ultrasonic transducer, the force of movement in the conductive film is proportional to the square of the voltage present across the assembly. This takes the form of:

$$F \sim V^2$$

Because the voltage of a signal modulated with audio content is a time varying signal of the form $$V = A \sin \omega t,$$

the output, which is proportional F, is also proportional to the square of this time-varying signal. Accordingly, $$\text{Out} \propto F \propto A \sin^2 \omega t,$$

which introduces a distortion component. This no longer linearly matches the output. To attempt to reduce this in conventional applications, designers have added a bias voltage, $V_0$ such the signal now takes the form $$V = A \sin \omega t + V_0.$$

However, this leads to an output that is proportional to $$V_0^2 + A^2 \sin^2 \omega t + V_0 A \sin \omega t.$$

Where the bias is much greater than A, the linear term, $V_0 A \sin \omega t$, is larger than the distortion component, $A^2 \sin^2 \omega t$, which minimizes the effect of the distortion. However, the distortion is always present.

However, with an implementation having two stators (e.g., front stator 222 and rear stator 225), the force of vibration of conductive element 220 is proportional to the voltage rather than square of the voltage. Accordingly, the non-linear distortion component, $A^2 \sin^2 \omega t$, is no longer present, and the system is much more linear as the force is proportional to the input:

$$F \propto A \sin \omega t.$$

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. An ultrasonic transducer, comprising:
    a first conductive element comprising first and second major surfaces;
    a second conductive element comprising first and second major surfaces and textural features formed on the first major surface of the second conductive element and arranged in spaced apart relation to the first conductive element with the first major surface of the second conductive element facing toward the first conductive element; and a third conductive element comprising first and second major surfaces and positioned between the first and second conductive elements such that the third conductive element does not contact the first conductive element and the second major surface of the third conductive element physically contacts at least some of the textural features of the second conductive element and forms a resonant cavity, wherein the third conductive element comprises an insulating layer and a conducting layer and wherein the third conductive element is oriented such that the insulating layer is disposed between the conducting layer and the second conductive element.

2. The ultrasonic transducer of claim 1, wherein the ultrasonic transducer has a resonant frequency and wherein the resonant frequency is defined by a volume of the open area between the second and third conductive elements.

3. The ultrasonic transducer of claim 2, wherein the resonant frequency is further defined by a tension, thickness and density of the third conductive element.

4. The ultrasonic transducer of claim 1, wherein the textural features comprise a plurality of ridges extending beyond the first major surface of the second conductive element.

5. The ultrasonic transducer of claim 4, wherein the ridges may comprise at least one of a triangular, square, rectangular, rounded or hemispherical cross-section.

6. The ultrasonic transducer of claim 4, wherein the ridges span part or all of the length or width of the second conductive element.

7. The ultrasonic transducer of claim 1, wherein the textural features comprise a plurality of spacers disposed on the first major surface of the second conductive element.

8. The ultrasonic transducer of claim 7, wherein the second conductive element comprises a conductive layer and an insulating layer, and the spacers comprise a plurality of dots disposed on the insulating layer of the second conductive element.

9. The ultrasonic transducer of claim 1, wherein the textural features comprise a plurality of dots disposed on the second conductive element.

10. The ultrasonic transducer of claim 8 or 9, wherein the dots comprise patterns of at least one of spherical, elongated, squared, polygonal, pyramidal, or hemispherical shapes.

11. The ultrasonic transducer of claim 1, wherein the first conductive element is transparent to ultrasonic signals.

12. The ultrasonic transducer of claim 1, wherein the first conductive element is sufficiently transparent to ultrasonic signals so as to not attenuate ultrasonic signals generated by the third conductive element by greater than 3 DB.

13. The ultrasonic transducer of claim 1, wherein the first conductive element is transparent to ultrasonic signals and the second conductive element is not transparent to ultrasonic signals such that, in operation, an ultrasonic signal is emitted from the ultrasonic audio transducer in one direction.

14. The ultrasonic transducer of claim 1, wherein the ultrasonic transducer is an ultrasonic audio transducer.

15. An ultrasonic transducer, comprising:
a first conductive element comprising first and second major surfaces;
a second conductive element comprising first and second major surfaces and arranged in spaced apart relation to the first conductive element with the first major surface of the second conductive element facing toward the first conductive element; and
a third conductive element comprising first and second major surfaces and positioned between the first and second conductive elements, wherein the third conductive element comprises an insulating layer and a conducting layer and wherein the third conductive element is oriented such that the insulating layer is disposed between the conducting layer and the second conductive element; and
a plurality of first spacers disposed between the second and third conductive elements and configured in touching relation to the second and third conductive elements.

16. The ultrasonic transducer of claim 15, further comprising a plurality of second spacers disposed between the first and third conductive elements and configured in touching relation to the first and third conductive elements.

17. The ultrasonic transducer of claim 15, wherein the ultrasonic audio transducer has a resonant frequency and wherein the resonant frequency is defined by a volume of the open area between the second and third conductive elements.

18. The ultrasonic transducer of claim 17, wherein the resonant frequency is further defined by a tension, thickness and density of the third conductive element.

19. The ultrasonic transducer of claim 15, wherein the first spacers comprise a plurality of dots disposed on the second conductive element.

20. The ultrasonic transducer of claim 15, wherein the second spacers comprise a plurality of dots disposed on the first conductive element.

21. The ultrasonic transducer of claim 15, wherein the first spacers comprise a plurality of dots disposed on one side of the third conductive element.

22. The ultrasonic transducer of claim 21, wherein the second spacers comprise a plurality of dots disposed on the opposite side of the third conductive element.

23. The ultrasonic transducer of claim 15, wherein the first spacers comprise a plurality of dots disposed on both sides of the third conductive element.

24. The ultrasonic transducer of claim 15, wherein the second conductive element comprises a conductive layer and an insulating layer, and the spacers comprise a plurality of dots disposed on the insulating layer of the second conductive element.

25. The ultrasonic transducer of claim 15, wherein the second conductive element comprises a conductive layer and an insulating layer, and the spacers comprise a plurality of dots disposed in touching relation with the insulating layer of the second conductive element.

26. The ultrasonic transducer of claim 15, 19, 20, 21, 23, 24 or 25 wherein the dots comprise patterns of at least one of spherical, elongated, squared, polygonal, pyramidal, or hemispherical shapes.

27. The ultrasonic transducer of claim 15, wherein the first conductive element is transparent to ultrasonic signals.

28. The ultrasonic transducer of claim 15, wherein the first conductive element is sufficiently transparent to ultrasonic signals so as to not attenuate ultrasonic signals generated by the third conductive element by greater than 3 DB.

29. The ultrasonic transducer of claim 15, wherein the first conductive element is transparent to ultrasonic signals and the second conductive element is not transparent to ultrasonic signals such that, in operation, an ultrasonic signal is emitted from the ultrasonic audio transducer in one direction.

30. The ultrasonic transducer of claim 15, wherein the ultrasonic transducer is an ultrasonic audio transducer.

31. An ultrasonic transducer, comprising:
a transformer comprising first and second inputs and first, second and third outputs, a first winding between the first and second inputs, a second winding between the first and second outputs and a third winding between the second and third outputs;
an ultrasonic audio transducer, comprising:
- a first stator electrically connected to the first output of the transformer;
- a second stator arranged in spaced apart relation to the first stator and electrically connected to the third output of the transformer;
- a conductive element positioned between the first and second stators and electrically connected to the second output of the transformer, the conductive element disposed such that it is at a first spacing from the first stator and a second spacing from the second stator, wherein the second spacing is less than the first spacing and wherein a ratio of the number of turns in the second winding to the number of turns in the third winding is proportional to the first and second spacings; and
- a plurality of textural features disposed between and in touching relation to the conductive element and the second stator; and
a bias source coupled between the second output of the transformer and the conductive element.

32. The ultrasonic transducer of claim 31, wherein the ratio is in the range of 8:1 to 10:1.

33. The ultrasonic transducer of claim 31, further comprising a resistive element coupled between the bias source and the conductive element.

34. The ultrasonic transducer of claim 31, wherein the textural features comprise a plurality of ridges extending beyond a first surface of the second stator.

35. The ultrasonic transducer of claim 31, wherein the ridges may comprise at least one of a triangular, square, rectangular, rounded or hemispherical cross-section.

36. The ultrasonic transducer of claim 31, wherein the ridges span part or all of the length or width of the second stator.

37. The ultrasonic transducer of claim 31, wherein the textural features comprise a plurality of spacers disposed on a first surface of the second stator.

38. The ultrasonic transducer of claim 37, wherein the second stator comprises a conductive layer and an insulating layer, and the spacers comprise a plurality of dots disposed on the insulating layer of the second stator.

39. The ultrasonic transducer of claim 31, wherein the textural features comprise a plurality of dots disposed on the second stator.

40. The ultrasonic transducer of claim 38 or 39, wherein the dots comprise patterns of at least one of spherical, elongated, squared, polygonal, pyramidal, or hemispherical shapes.

* * * * *